United States Patent [19]

Ziv

[11] 4,245,856
[45] Jan. 20, 1981

[54] EMERGENCY RELEASE FOR PASSIVE SEAT BELT SYSTEMS

[75] Inventor: Avraham Ziv, Sepulveda, Calif.

[73] Assignee: American Safety Equipment Corporation, San Fernando, Calif.

[21] Appl. No.: 42,022

[22] Filed: May 24, 1979

[51] Int. Cl.$^3$ .............................................. B60R 21/10
[52] U.S. Cl. .................................... 280/802; 297/469
[58] Field of Search ............... 280/801, 802, 803, 804, 280/805, 806, 807, 808; 297/468, 469, 483

[56] References Cited

U.S. PATENT DOCUMENTS

| 4,150,843 | 4/1979 | Reid | 280/801 |
| 4,180,283 | 12/1979 | Ziv | 280/802 |

FOREIGN PATENT DOCUMENTS 1101987  3/1961  Fed. Rep. of Germany ........... 280/801

*Primary Examiner*—John A. Pekar
*Attorney, Agent, or Firm*—Poms, Smith, Lande & Rose

[57] ABSTRACT

An emergency release mechanism in a passive seat belt system provides a vehicle occupant with an extra section of belting material by which the occupant may extricate himself from the vehicle in emergency situations where the position of the vehicle or the condition of the system is such that the seat belt could not otherwise be slackened. In passive systems, the seat belt is retractably mounted either to the vehicle floor or door, passed over the upper torso of the vehicle floor or door, passed over the upper torso of the vehicle occupant and permanently attached to an anchor bracket attached to the door or floor, respectively. The emergency release portion of the system releasably attaches an intermediate portion of the seat belt to the anchor bracket, thereby defining an open loop of belting material between the permanently-attached end and the releasably-attached intermediate sections of the belt. The intermediate portion of the belt attaches to the anchor bracket by means of a tongue latching into a buckle mounted on the anchor bracket. In normal operation, the tongue engages the buckle and the loop of belting material is folded against the upper portion of the seat belt. In emergency situations, the tongue is released from the buckle, causing the loop to elongate and to thereby slacken the seat belt, allowing the occupant to escape from the vehicle. A scabbard attached to the seat belt holds the open loop folded against the seat belt when the emergency release is not deployed.

26 Claims, 7 Drawing Figures

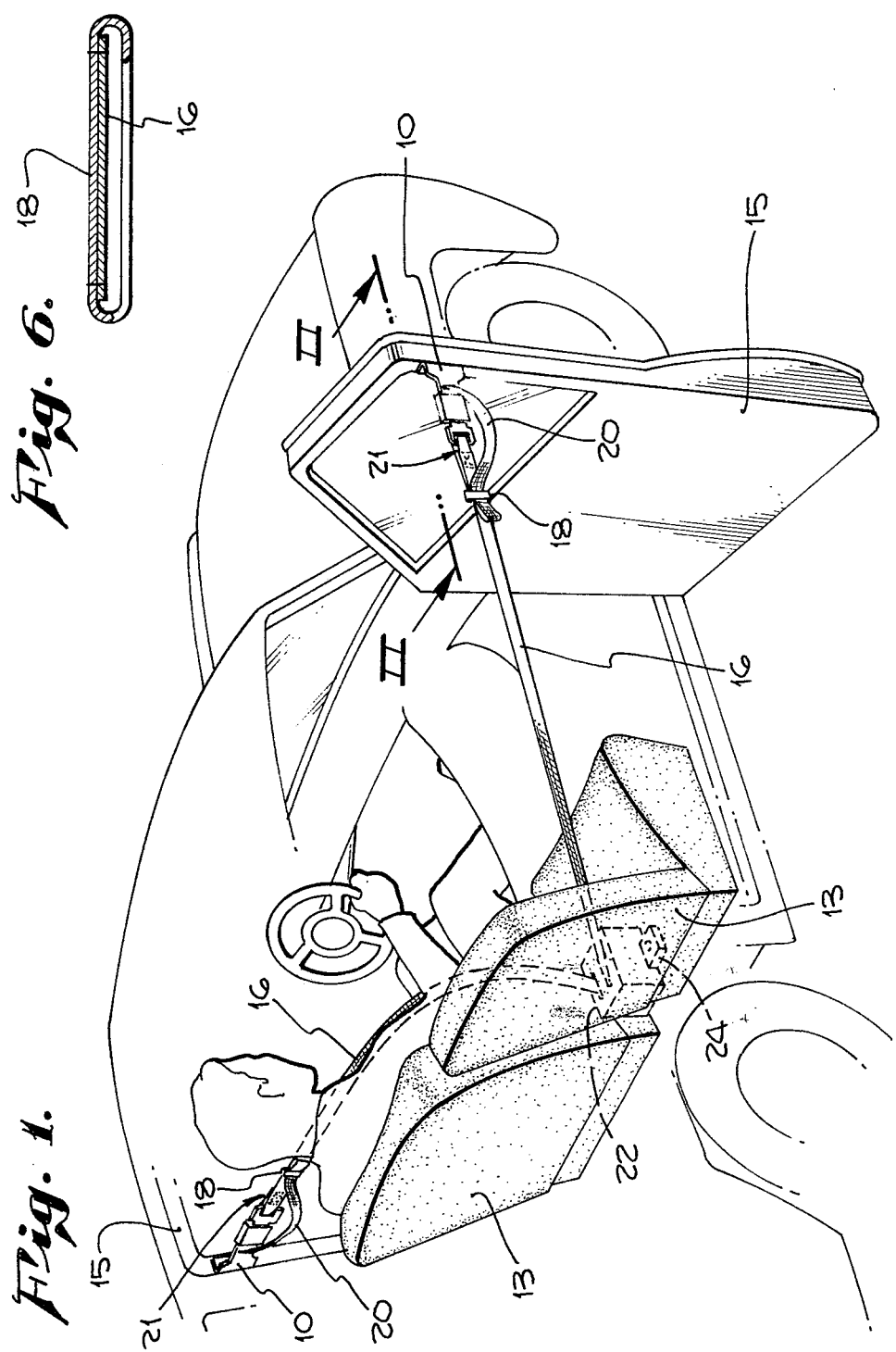

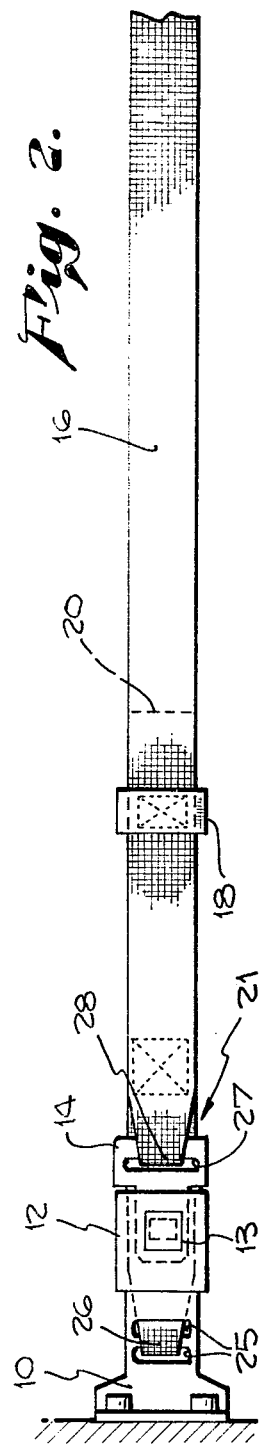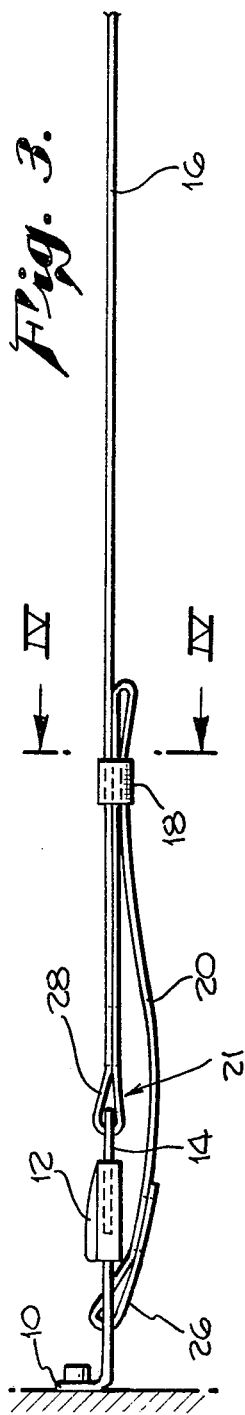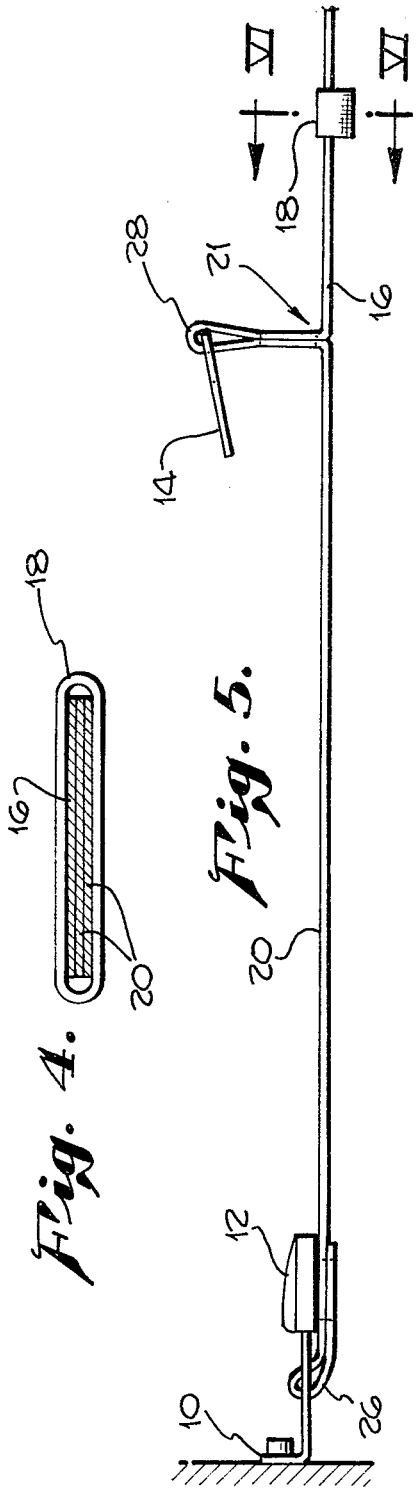

EMERGENCY RELEASE FOR PASSIVE SEAT BELT SYSTEMS

FIELD OF THE INVENTION

The present invention relates to vehicle safety belts and in particular to passive safety belt systems incorporating emergency release mechanisms.

BACKGROUND OF THE INVENTION

Passive seat belt systems are becoming increasingly popular in vehicles. In a passive system, the seat belt is automatically positioned around the vehicle occupant as the occupant enters the vehicle and closes the door. The popularity of the passive system arises from the fact that it is self-deploying upon entry to and exit from the vehicle.

Passive systems are of typically two configurations. In one configuration, the seat belt is mounted by means of a seat belt retractor to the floor of the vehicle. The seat belt passes over the upper torso of the occupant to an anchor point on the vehicle door. The other configuration typically used in vehicles retractably mounts the seat belt to the door of the vehicle and has the anchor point on the vehicle floor. The retractor is an integral part of any passive system. The retractor protracts or extends the seat belt as the door is opened upon entry into or exit from the vehicle. Likewise, when the door of the vehicle is closed with the occupant seated the retractor removes the slack from the belt, thereby automatically positioning the belt to restrain the vehicle occupant in the event of an emergency stop or accident.

The passive systems found in the prior art are not without limitations, however. For example, in an effort to allow repair or maintenance activities to be performed on the interior of the vehicle, and to allow the occupant a choice of whether or not to use the passive system, the seat belts in some passive systems have been releasably attached to the anchor point. A typical arrangement places a seat belt buckle on the end of the belt and a tongue member on the anchor point. In the normal mode of operation the buckle on the belt would be connected to the tongue member. However, if the occupant wishes, for some reason, to break the connection between the seat belt and the anchor point, the buckle is released and the seat belt winds back into the retractor. All too often, the seat belt is never reconnected to the door. That is, this type of passive system lends itself to easy defeating by the occupant.

In an effort to prevent the defeating of the passive system by the occupant, certain other types of passive systems permanently attach the end of the seat belt to the anchor point. In these types of systems, the seat belt cannot be released at the anchor point or at the retractor. This system, however, also has certain limitations. The first of these is that in an accident situation where the door is damaged to the extent that it will not open, the seat belt may possibly hamper removal of the vehicle occupant.

Another limitation involves the effect of the seat belt retractor mechanism. The types of seat belt retractors commonly utilized in passive systems include inertia sensing mechanisms which lock the seat belt against protraction in emergency situations. The inertia sensing mechanism performs its function by sensing the rapidity of movement of the vehicle and/or of the occupant, and locks the belt upon sharp deceleration of one or both. A possibility exists, if the retractor becomes damaged in an accident situation, that the removal of the belt from the occupant can be hampered by the resulting inability to protract the belt. A possibility also exists, if the vehicle ends up upside down or on its side, that the weight of the occupant against the belt will impede the disengaging of the inertia sensing mechanism, thereby also hampering exit from the vehicle.

The passive systems found in the prior art do not provide a satisfactory solution to the problem of designing a passive system which cannot be defeated by the occupant, and yet allows a rapid exit from the vehicle in an emergency situation. Accordingly, it is the principal object of this invention to improve the design of passive seat belt systems having the seat belt permanently attached to the door.

It is another object of this invention to improve the safety of passive seat belt systems.

It is another object of this invention to allow the occupant of a vehicle employing a passive system to quickly exit the vehicle in an accident situation.

It is a final object of this invention to release the tension of a passive seat belt in an accident situation in which such releasing would not otherwise be possible.

SUMMARY OF THE INVENTION

The present invention, in a broad aspect, provides an emergency release for a passive seat belt system having a seat belt retractably mounted either to the floor or door of a vehicle, passed over the upper torso of an occupant, and permanently attached to an anchor bracket located on the door or floor, respectively. In the emergency release, an intermediate portion of the seat belt is releasably attached to the anchor bracket along with the permanently attached end of the seat belt. In this manner, an open loop of belting material is defined between the permanently-attached end of the belt and the releasably-attached intemediate portion. When the seat belt system is used in its normal manner, the intermediate portion of the belt is attached, along with the end of seat belt, to the door anchor bracket. In an emergency situation, the connection between the anchor bracket and the intermediate portion of the seat belt is broken, thereby elongating the loop of material and slackening the seat belt. Accordingly, escape from the vehicle is facilitated under conditions in which the tension of the belt might otherwise hamper exit from the vehicle.

In accordance with one feature of the invention, the emergency release includes a scabbard attached to the seat belt for holding the open loop of belt material folded against the seat belt when the intermediate portion of seat belt is attached to the anchor bracket. The end of the folded loop is positioned within the scabbard. When the connection between the intermediate section of the seat belt and the anchor bracket is severed, the scabbard allows the folded loop to elongate, thereby slackening the seat belt.

In accordance with still another feature of the invention, a manually operable latch or buckle attached to the anchor bracket and a tongue member attached to an intermediate section of the seat belt open loop releasably attach the intermediate section of the seat belt to the anchor bracket. Pushable means can be utilized in the latch or buckle to facilitate the quick disconnecting of the tongue from the buckle. Breaking the connection between the buckle and the tongue thereby causes the elongation of the otherwise folded loop of material and the slackening of the seat belt.

In accordance with another aspect of the invention, the open loop of material defined between the end of the seat belt and the referenced intermediate portion can be formed by an section of belting material integrally interwoven with the remainder of the seat belt, or can be a distinct section of belting material connected to what would otherwise be the end of the seat belt.

In accordance with still another aspect of the invention, the anchor bracket and the tongue can include receiving slots for affixing the end of the seat belt, and the intermediate portion of the seat belt, respectively, to them.

In accordance with a final feature of the invention, an open loop of material approximately three feet in length allows a sufficient slackening of the seat belt to accomplish the objects of the invention.

Other objects, features, and advantages of the present invention will become apparent from a consideration of the following detailed description and from the accompanying drawings.

BRIEF DESCRIPTION OF THE DRAWINGS

FIG. 1 shows a cut-away view of a vehicle employing one configuration a passive seat belt system employing an emergency release illustrating the principles of the present invention;

FIG. 2 shows a view, taken through plane II—II, of the emergency release portion seat belt system shown in FIG. 1 when in its normal mode of operation;

FIG. 3 shows a side view of the emergency release portion of the seat belt system shown in FIG. 2;

FIG. 4 shows a view of the emergency release shown in FIG. 3, taken through plane IV—IV; and FIG. 5 shows a side view of the emergency release portion of the seat belt system shown in FIG. 1 when in its released position;

FIG. 6 shows a view of the emergency release shown in FIG. 5, taken through plane VI—VI.

DETAILED DESCRIPTION

Figure 7:
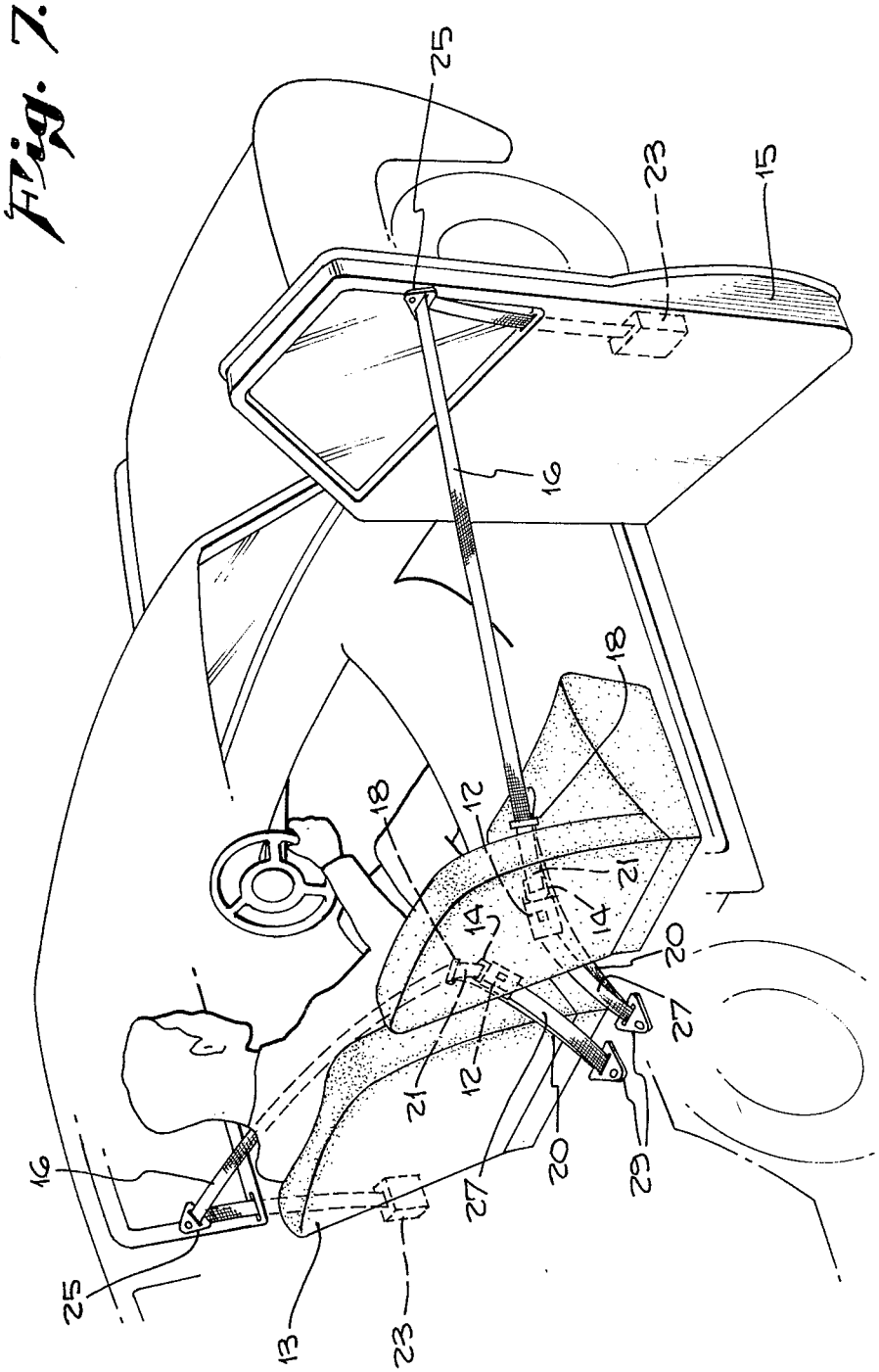
FIG. 7 shows a cut-away view of a vehicle with another configuration of a passive seat belt system employing an emergency release illustrating the principles of the present invention.

Referring more particularly to the drawings, FIG. 1 shows an automobile 11 employing one configuration of a passive seat belt system incorporating an emergency release constructed according to the present invention. The automobile 11 has a pair of seats 13 located adjacent to doors 15 which are hingedly mounted for rotation outward about a vertical axis forward of the seats 13. Passing from a seat belt retractor mechanism 22 located between the seats 13 and containing a pair of retractors are a pair of seat belts 16. A mounting bracket 24 attached the retractor mechanism 22 to the floor of the vehicle 11. The end of each seat belt 16 is permanently attached to a anchor bracket 10 located on the door 15 in a position above the seat 13. For purposes of describing the present invention, the operation of only one seat belt will be discussed. It is to be understood, however, that both seat belts operate in identical fashions.

The passive seat belt system shown in FIG. 1 is self-deploying upon entry to and exit from the vehicle. That is, as an occupant prepares to enter the vehicle by opening the door 13, the belt 16 is pulled out of the retractor 22 and away from the seat 13, thus allowing the occupant to position himself on the seat. As the door is closed, the belt is automatically positioned by the retractor 22 to restrain the occupant in the event of an emergency stop or accident. Upon exit from the vehicle, the opening of the door 13 again pulls the seat belt 16 away from the occupant, thus facilitating exit from the vehicle. As is seen, the retractor 22 both allows protraction of the seat belt 16 when the vehicle door 15 is in an open position, and retracts the belt 16 when the door 15 is in a closed position.

As shown in FIG. 3, the emergency release portion of the passive seat belt system releasably attaches an intermediate portion 21 of the seat belt to the door anchor bracket 10. In this manner an open loop of belting material 20 is formed between the end of the seat belt 16 permanently attached to the door anchor bracket 10 and the intermediate portion 21 of the seat belt attached to the door anchor bracket 10. The loop 20 may be, as shown in FIG. 3, an extra section of belting material integrally interwoven with the remainder of the seat belt 16, or it can be a distinct section of belting material attached to what would otherwise be the end of the seat belt.

As is seen in FIG. 2, the end of the seat belt 16 is permanently attached to the door anchor bracket 10 through a pair of slots 25. One end of the belt 16 is passed through the slots 25 before being attached back to itself by sewing or by other fastening methods. In this manner, the end of the seat belt 16 forms a mounting loop 26 through the door anchor bracket 10. It is to be understood that other methods of attaching the seat belt end to the door anchor 10 may also be utilized. For example, the end of the belt could be fitted into the end of a rigid tongue member, which could be pivotally attached to the door anchor bracket 10 by means of a pin or similar device.

As is seen in FIG. 3, when the open loop 20 comprises an integral section of the seat belt 16, the intermediate portion 21 is defined by a loop 28 formed by passing the seat belt through a slot 27 in a tongue member 14 prior to being sewn or otherwise attached back to itself. When the open loop 20 is not an integral portion of the seat belt 16, but rather is a distinct section of belting material attached to the seat belt 16, the mounting loop 28 may be replaced by another configuration to attach the intermediate portion 21 of seat belt to the tongue member 14. In this regard, the intermediate portion 21 could be press-fit into a tongue member having a receptacle for receiving the seat belt and the distinct section of belting material could be affixed to the interemdiate portion 21 by means of thread, rivets, or other fastening methods.

The tongue member 14, which is attached to the intermediate portion 21 of the seat belt 16, is adapted to be positioned within a buckle or latch 12 mounted on the anchor bracket 10. The buckle 12 and tongue member 14 can be similar in construction to the buckle and tongue assemblies normally found on seat belt systems. In this regard, the buckle 12 is a manually operable device providing the capability to quickly disconnect the tongue member 14 from it. The disconnection may be made, for example, by a spring-loaded release 13 which is pushably activated from outside of the buckle 12.

As shown in FIGS. 1 to 3, in the normal configuration of the passive seat belt system, the tongue member 14 is latched into the buckle 12, and the open loop of material 20 is folded back against the seat belt 16. As illustrated in FIG. 4, a scabbard 18 is formed on the seat belt 16 by a loop of belting material. The scabbard 18 is attached to the belt 16 in a position to hold the end of the open loop 20 folded against the belt when the emergency release is not activated. With the open loop 20 folded against the seat belt 16, the seat belt retractor 24 positions the seat belt 16 against the driver in the normal configuration.

In an emergency situation in which the seat belt retractor will not allow the seat belt 16 to be protracted to a degree whereby the vehicle occupant can extricate himself from beneath the seat belt 16, or in which the door of the vehicle is prevented from opening, the buckle 12 is operated by the occupant to release the tongue member 14. As shown in FIGS. 5 and 6, when the tongue member 14 is released from the buckle 12, the open loop 20, which is otherwise folded by the scabbard 18 against the seat belt 16, is pulled out of the scabbard 18. In this manner, the open loop 20 elongates and provides an additional section of belting material to the seat belt 16. This extra section of belting allows the seat belt 16 to slacken and thus facilitates exiting the vehicle by the occupant.

As discussed, the ability to slacken the seat belt enhances the safety of the passive system. This feature is very useful when the vehicle is in a position in which the weight of the occupant against the seat belt hampers protraction of the belt from the retractor. Additionally, the slackening of the belt allows the occupant to release himself from the seat belt system when the seat belt retractor is damaged so as to hamper protraction. Accordingly, the safety of a passive system of the type in which the end of the seat belt is permanently affixed to the door is greatly enhanced.

The emergency release described does not affect the integrity of the passive system. That is, if the tongue member 14 is accidentally released from the buckle 12 in a non-emergency situation, the extra slack in the seat belt 16 provided by the open loop 20 will be taken in by the seat belt retractor 24. Obviously, however, the emergency release function provided by the open loop 20 is then deactivated. But, the seat belt 16 still provides the proper restraint for the vehicle occupant.

The open loop of belting material 20, defined between the end and intermediate portions of the belt 16, is of a length which can be conveniently folded back by the scabbard 18 against the upper section of the seat belt 16 and provide, when released, enough slack in the seat belt 16 to facilitate the exiting of the vehicle by the occupant. In this regard, it has been found that an open loop of material approximately three feet in length produces satisfactory results. That is, the tongue member 14 is attached to the belt 16 approximately three feet from the end of the belt. When a loop 20 of this length is utilized, the scabbard 18 is attached to the seat belt 16 approximately one foot from the tongue member 14, thereby allowing the open loop 20 to be folded approximately in half. The resulting position of the folded loop 20 is thus above the occupant's shoulder when the occupant is seated in the vehicle. Likewise, a longer loop 20 of belting material could be utilized, with more of the loop being folded into the scabbard 18.

FIG. 7 shows another configuration of the passive seat belt system incorporating an emergency release implementing the principles of the present invention. In FIG. 7, a seat belt retractor 23 for each seat belt 16 is mounted upon the vehicle door 15, instead of utilizing a floor-mounted retractor 22 for the belts as shown in FIG. 1. Each seat belt 16 passes through a deflector bracket 25 to an anchor bracket 29 permanently affixed to vehicle floor.

In this configuration, the intermediate portion 21 of the seat belt 16 is releasably attached to the floor anchor bracket 29 by means of an auxiliary section 27 of belting material permanently affixed to the bracket 29. As with the configuration discussed previously, this produces an open loop of belting material 20 between the end of the seat belt 16 permanently attached to the floor bracket 29 and the intermediate portion 21 of the seat belt 16 releasably attached (through the auxiliary Section 27) to the bracket 29.

The purpose of the auxiliary section 27 of belting material attached to the floor anchor bracket 29 is to move the buckle or latch 12 closer to the vehicle occupant so that disengagement of the tongue member 14 from the buckle or latch 12 is easily accomplished. The functions of the floor anchor bracket 29 and the auxiliary section 27 of belting material are identical to that provided by the door anchor bracket 10, as shown in FIGS. 1 through 6.

With the exception of the auxiliary section 27 of belting material, the operation and implementation of the emergency release shown in FIG. 7 is identical to that described previously. As before, a scabbard 18 attached to the belt 16 holds the end of the open loop 20 folded against the belt when the emergency release is not activated.

As is seen, the present invention may be utilized with a variety of passive seat belt system configurations and yet provide the important safety features described herein. In addition to those configurations described hereinabove, the present invention can be implemented on seat belt systems including both shoulder and lap belts, and on systems employing automatic positioning mechanisms for the belts. (In such latter systems, the seat belt is positioned initially behind the driver and is automatically repositioned in front of the driver by electromechanical means within the vehicle.)

In the foregoing description of the present invention, a preferred embodiment of the invention has been disclosed. It is to be understood that other mechanical and design variations are within the scope of the present invention. Thus, by way of example and not of limitation, different types of belting material could be utilized to form the open loop; the loop scabbard could be oriented differently on the seat belt or perhaps even eliminated; different types of latches and tongue members could be used to attach the intermediate portion of the seat belt to the door or floor anchors; and the length of the belt could be different than as described herein. Accordingly, the invention is not limited to the particular arrangement which has been illustrated and described in detail.

What is claimed is:

1. In a vehicle passive seat belt system having a seat belt attached between the vehicle floor and a door disposed adjacent to an occupant and hingedly mounted for rotatable opening about a vertical axis disposed forward of the occupant's seat, with said belt passing over the torso of the occupant and being retractably mounted at one end to said vehicle and being permanently mounted at the other end to an anchor bracket within said vehicle, an emergency release for said seat belt system comprising means for releasably attaching an intermediate portion of said belt to said anchor bracket, whereby an open loop of belting material is defined by said end permanently attached to said bracket and said intermediate portion releasably attached to said bracket, said loop elongating when said intermediate portion is released from said bracket, said elongation slackening said seat belt and facilitating the exit of said occupant from said vehicle under conditions in which said exit would be difficult without such slackening.

2. An emergency release as defined in claim 1, further comprising means for holding said open loop of belting material folded against said seat belt when said intermediate portion of seat belt is attached to said anchor bracket and for allowing said folded loop to open when said means for releasing is activated and said intermediate portion is disconnected from said anchor bracket.

3. An emergency release as defined in claim 2, wherein said means for holding said loop folded comprises a narrow loop of belting material affixed to said seat belt, said narrow loop being positioned on said seat belt so as to enclose the folded end of said open loop of belting material.

4. A seat belt system as defined in claim 1, wherein said means for releasably attaching comprises:
   a tongue member connected to said intermediate portion of said seat; and
   buckle means, affixed to said anchor bracket, for attaching said tongue member to said anchor bracket, said buckle means including pushable means for disconnecting said tongue member, said buckle means engaging said tongue member when said seat belt system is in normal use, and said buckle means releasing said tongue member, as said occupant pushes said pushable means, in an emergency situation.

5. A seat belt system as defined in claim 1, wherein said means for releasably attaching comprises:
   a tongue member connected to said intermediate portion of said seat belt; and
   manually operable latch means, mounted to said anchor bracket, for attaching said tongue member to said anchor bracket, said manually operable latch means being adapted to be quickly released by said occupant, said latch means engaging said tongue member when said system is in normal use and said latch means being used by said occupant to release said tongue member in an emergency situation.

6. An emergency release as defined in claims 4 or 5, wherein said tongue member includes belting material receiving slot means for attaching said intermediate portion of said seat belt to said tongue member.

7. An emergency release as defined in claim 1, wherein said anchor bracket includes a plurality of belting material receiving slot means for affixing said seat belt to said anchor bracket.

8. An emergency release as defined in claim 1, wherein said open loop comprises an extra section of belting material integrally interwoven with the remainder of said seat belt.

9. An emergency release as defined in claim 1, wherein said open loop comprises a distinct section of belting material attached to said seat belt, the attachment location on said seat belt defining said intermediate portion.

10. An emergency release as defined in claim 1, wherein said loop of belting material is approximately three feet in length.

11. An improved passive seat belt system of the type having a seat belt retractably mounted to the floor of a vehicle and passing over the torso of an occupant to a vehicle door disposed adjacent to the occupant, wherein the improvement comprises:
   means for permanently attaching the end portion of said seat belt to said door; and
   means for releasably attaching an intermediate portion of said seat belt to said door, whereby an open loop of belting material is formed adjacent to said door when said intermediate portion of said seat belt is attached to said door, said intermediate portion being attached to said door when said system is in normal use, and said intermediate portion being manually released by said occupant from said door in an emergency situation, whereupon said loop of material elongates and allows said seat belt to slacken.

12. An improved seat belt system as defined in claim 11, wherein said means for permanently attaching said end portion to said foor comprises a door anchor bracket, permanently affixed to said door, said anchor bracket including belting material receiving slots for attaching the end portion of said seat belt to said door.

13. An improved seat belt system as defined in claim 12, wherein said means for releasably attaching said intermediate portion of said belt to said door comprises:
   tongue means, connected to said intermediate portion of said seat belt, for connecting said portion to said anchor bracket; and
   buckle means, fixedly mounted to said anchor bracket, for attaching said tongue means to said anchor bracket, said buckle means engaging said tongue means when said seat belt system is in normal use, with said occupant utilizing said buckle means to release said tongue means in an emergency situation.

14. An improved seat belt system as defined in claim 11, further comprising means for holding said open loop of belting material folded against said seat belt when said intermediate portion is attached to said door, and for allowing said folded loop to open when said means for releasing is activated and said intermediate portion of said seat belt is disconnected from said door.

15. An improved passive seat belt system of the type having a seat belt retractably mounted to the floor of a vehicle and passing over the torso of an occupant to a vehicle door disposed adjacent to the occupant, wherein the improvement comprises anchor bracket means, attached to said door, for permanently attaching the end portion of said seat belt to said door and for releasably attaching an intermediate portion of said seat belt to said door, whereby an open loop of belting material adjacent to said door is formed when said end portion and said intermediate portion of said belt are attached to said bracket, said intermediate portion being attached to said bracket when said system is in normal use, with said occupant disengaging said intermediate portion from said bracket means in an emergency situation, whereupon said loop of belting material elongates and allows said seat belt to slacken, thereby facilitating exit of said occupant from said vehicle.

16. An improved seat belt system as defined in claim 15, wherein said anchor bracket means comprises:
   a bracket member attached to said door;
   belting material receiving slot means, defined within said bracket member, for permanently attaching said end portion of said belt to said door; and buckle means, mounted to said bracket member, for releasably engaging said intermediate portion of said seat belt.

17. An improved seat belt system as defined in claim 16, wherein said system further comprises tongue means, attached to said intermediate portion of said seat belt, for connecting said intermediate porton to said buckle means.

18. An improved seat belt system as defined in claim 16, wherein said system further comprises means for holding said open loop of belting material folded against said seat belt when said intermediate portion of said seat belt is attached to said bracket means and for allowing said folded loop to open when said intermediate portion is released from said bracket means.

19. An improved vehicle passive seat belt system of the type having a seat belt retractably mounted to a vehicle door disposed adjacent to an occupant and passing over the torso of the occupant, wherein the improvement comprises:
means for permanently attaching the end portion of said seat belt to said floor; and
means for releasably attaching an intermediate portion of said seat belt to said floor, whereby an open loop of belting material is formed adjacent to said floor when said intermediate portion of said seat belt is attached to said floor, said intermediate portion being attached to said floor when said system is in normal use, and said intermediate portion being manually released by said occupant from said floor in an emergency situation whereupon said loop of material elongates and allows said seat belt to slacken.

20. An improved seat belt system as defined in claim 19, wherein said means for permanently attaching said end portion to said door comprises a floor anchor bracket permanently affixed to said floor, said anchor bracket including belting material receiving slots for attaching the end portion of said seat belt to said bracket.

21. An improved seat belt system as defined in claim 20, wherein said means to releasably attaching said intermediate portion of said belt to said floor comprises:
an auxiliary section of belting material attached to said floor anchor bracket, said auxiliary section being of a length to place said intermediate portion adjacent said occupant;
tongue means, connected to said intermediate portion of said seat belt, for connecting said portion to said auxiliary section of belting material; and
buckle means, fixedly attached to said auxiliary section of belting material, for attaching said tongue means to said anchor bracket through said auxiliary section, said buckle means engagaing said tongue means when said seat belt system is in normal use, with said occupant utilizing said buckle means to release said tongue means in an emergency situation.

22. An improved seat belt system as defined in claim 19, further comprising means for holding said open loop of belting material folded against said seat belt when said intermediate portion is attached to said floor, and for allowing said folded loop to open when said means for releasing is activated and said intermediate portion of said seat belt is disconnected from said floor.

23. An improved passive seat belt system of the type having a seat belt retractably mounted to a vehicle door disposed adjacent to an occupant and passing over the torso of the occupant to the vehicle foor, wherein the improvement comprises mounting means, attached to said floor, for permanently attaching the end portion of said seat belt to said floor and for releasably attaching an intermediate portion of said seat belt to said floor, whereby an open loop of belting material is formed adjacent to the occupant when said end portion and said intermediate portion of said belts are attached to said mounting means, said intermediate portion being attached to said mounting means when said system is in normal use, with said occupant disengaging said intermediate portion from said mounting means in an emergency situation, whereupon said loop of belting material elongates and allows said seat belt to slacken, thereby facilitating exit of said occupant from said vehicle.

24. An improved seat belt system as defined in claim 23, wherein said mounting means comprises:
a bracket member attached to said floor;
belting material receiving slot means, defined within said bracket member, for permanently attaching the end portion of said seat belt to said floor;
an auxiliary section of belting material attached to said bracket member, said auxiliary section being of a length to place said intermediate portion adjacent said occupant; and
buckle means, attached to said auxiliary section, for releasably engaging said intermediate portion of said seat belt.

25. An improved seat belt system as defined in claim 24, wherein said system further comprises tongue means, attached to said intermediate portion of said seat belt, for connecting said intermediate portion to said buckle means.

26. An improved seat belt system as defined in claim 24, wherein said system further comprises means for holding said loop of belting material folded against said seat belt when said intermediate portion of said seat belt is attached to said mounting means and for allowing said folded loop to open when said intermediate portion is released from said mounting means.

* * * * *